(No Model.)
A. M. LIVELSBERGER.
HAY LOADER.
No. 520,324. Patented May 22, 1894.
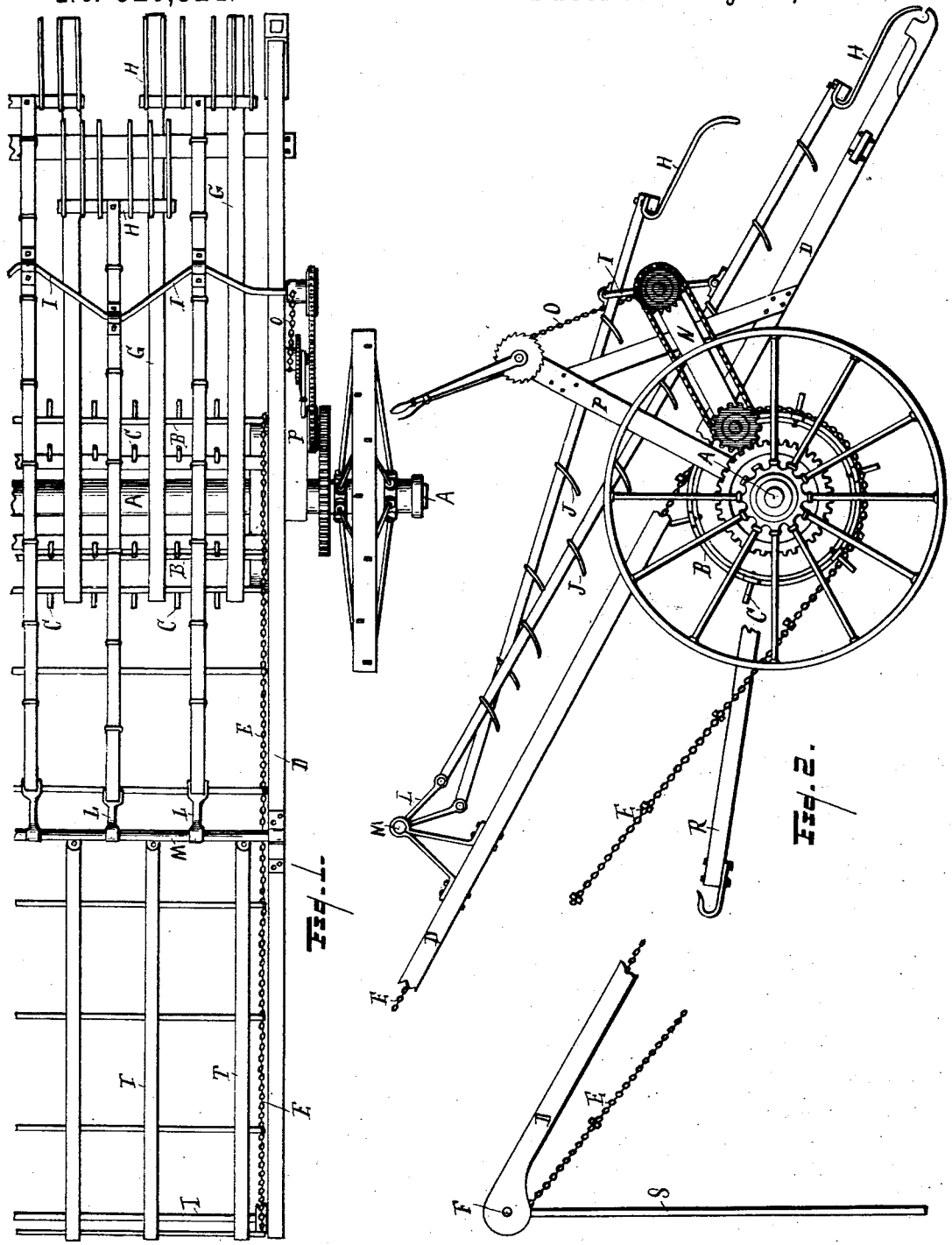
WITNESSES
Newton G. Leslie.
Livi. F. Cox
INVENTOR
Albert M. Livelsberger
By Lucius C. West
atty

UNITED STATES PATENT OFFICE.

ALBERT M. LIVELSBERGER, OF KALAMAZOO, MICHIGAN.

HAY-LOADER.

SPECIFICATION forming part of Letters Patent No. 520,324, dated May 22, 1894.

Application filed September 28, 1893. Serial No. 486,702. (No model.)

*To all whom it may concern:*

Be it known that I, ALBERT M. LIVELSBERGER, a citizen of the United States, residing at Kalamazoo, county of Kalamazoo, State of Michigan, have invented a new and useful Hay-Loader, of which the following is a specification.

The main object of this invention is to construct a hay-loader employing an endless carrier and alternately reciprocating rakes and to combine with said parts a toothed cylinder, in a position in relation therewith to facilitate the movement of the hay and to obviate breaking the hay and thrashing the heads thereof.

In the drawings forming a part of this specification Figure 1 is a broken plan view; and Fig. 2 is a side elevation of Fig. 1.

Referring to the lettered parts of the drawings, A is an axle, bearing the traction wheels of the loader. Upon this axle, between the wheels, is mounted a cylinder, B, provided around its periphery with a series of teeth, C. The endless carrier, E, is mounted upon this cylinder and driven thereby. The upper end of this carrier runs on the pulleys of a shaft, F, of the frame, D, in the ordinary manner.

Instead of driving the carrier, E, by the cylinder, B, it of course may be driven by other means, so long as the relationship here shown between the carrier and the cylinder is preserved.

The frame, D, which extends from the ground on an incline upward to the load, in the ordinary manner, is provided with side boards when in use, said side boards not being here shown, so as to more clearly illustrate the other parts. The lower end of the frame, D, up as far as the cylinder, is provided with a series of separated slats, G, Fig. 1, forming an inclined surface or bridge, up which the hay is carried by the rakes, H, said rakes being in sets which reciprocate alternately with each other, by means of the zigzag crank-shaft, I, as in ordinary constructions. The handles of these rakes are provided with a series of downwardly projecting prongs, J, which catch into the hay and assist in moving it upward.

In the operation, when the hay, which moves up the inclined bridge, G, is delivered on to the cylinder, B, the teeth, C, of said cylinder catch into the hay on the under side and assist the rakes with their prongs, J, in delivering it on the endless carrier, E. By this means the hay is delivered on to the endless carrier with very little handling, to that extent that it is not broken nor the heads thrashed, and the carrier freely delivers it on to the load without any further pounding and breaking, such as has been found to be the case in some instances where the hay was conveyed from the ground to the load by reciprocating rakes alone. This construction overcomes the difficulty of the cylinder teeth catching into the carrier and the skipping of hay in hollow places, found in the use of hay loaders employing a toothed cylinder to do the raking. The upper ends of the rake handles are pivotally attached to the arms, L, said arms being pivoted to the transverse rod, M, of the frame, D, but so far as this part of the construction is concerned, these ends of the rake arms may be attached by any suitable means. The rakes are adjustable, so as to be nearer to or farther from the frame, D, by means of the swinging standards, N, in the outer end of which the crank shaft, I, has bearings. These standards are connected by the chain, O, with a ratchet shaft at the top of the standard, P, of the frame, and wind on said shaft when raising the rakes. Of course it will be understood that the tongue, R, in Fig. 2, is for attaching the loader to the wagon. At the upper end of the frame, D, and pivotally attached to the rod, F, is a wing, S, which swings against the load at the rear of the wagon, to assist in keeping the load in shape.

In Fig. 1 are shown the ordinary slats, T, which prevent the wind from blowing the hay off from the endless carrier, said slats not being shown in Fig. 2.

It should be observed that approximately one half of the machine is shown in Fig. 1, but it will be understood that the other side of the machine is like the one shown.

Having thus described my invention, what I claim as new, and desire to secure by Letters Patent of the United States, is—

1. In a hay loader, the combination of a suitable frame, an endless carrier in the upper portion of said frame, alternately reciprocating rakes in the lower portion, and a revoluble toothed cylinder at the lower end of said endless carrier; substantially as set forth.

2. The combination of a suitable frame, an inclined bridge in the lower part of said frame, alternately reciprocating rakes above said bridge, an endless carrier in the upper portion of said frame, and a revoluble toothed cylinder at the juncture of said bridge and carrier; substantially as set forth.

3. The combination of a wheeled frame, a revoluble toothed cylinder mounted upon the axle of the wheels of said frame and revolved thereby, an endless carrier in the upper portion of said frame, mounted upon and driven by said cylinder, a slatted inclined bridge in the lower portion of said frame, and alternately reciprocating rakes above said bridge; substantially as set forth.

In testimony to the foregoing, I have hereunto subscribed my name in the presence of two witnesses.

ALBERT M. LIVELSBERGER.

Witnesses:
NEWTON G. LESLIE,
LEVI F. COX.